(12) United States Patent
Yoo

(10) Patent No.: US 9,124,880 B2
(45) Date of Patent: Sep. 1, 2015

(54) METHOD AND APPARATUS FOR STEREOSCOPIC IMAGE DISPLAY

(71) Applicant: SAMSUNG ELECTRONICS CO., LTD., Suwon-si (KR)

(72) Inventor: Jun-mo Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 142 days.

(21) Appl. No.: 13/846,107

(22) Filed: Mar. 18, 2013

(65) Prior Publication Data

US 2013/0293446 A1 Nov. 7, 2013

(30) Foreign Application Priority Data

May 3, 2012 (KR) .................. 10-2012-0046711

(51) Int. Cl.
*H04N 13/04* (2006.01)
(52) U.S. Cl.
CPC ....... *H04N 13/0404* (2013.01); *H04N 13/0402* (2013.01); *H04N 13/0434* (2013.01); *H04N 13/0438* (2013.01); *H04N 13/0452* (2013.01)
(58) Field of Classification Search
CPC .......... G09G 5/00; G06T 15/00; G02B 26/00; G02B 27/22; G02F 1/1335; H04N 13/04; H04N 13/0402; H04N 13/0404; H04N 13/0434; H04N 13/0438; H04N 13/0452; G03B 21/00
USPC ........ 345/6, 96, 117, 237, 419; 353/7; 348/51
See application file for complete search history.

(56) References Cited

U.S. PATENT DOCUMENTS

2006/0176541 A1* 8/2006 Woodgate et al. ............ 359/237
2007/0182885 A1* 8/2007 Egi et al. ....................... 349/96
2009/0244682 A1 10/2009 Saishu et al.
(Continued)

FOREIGN PATENT DOCUMENTS

CN 101762880 A 6/2010
CN 101840073 A 9/2010
(Continued)

OTHER PUBLICATIONS

Communication dated Oct. 10, 2014 issued by the State Intellectual Property Office in counterpart Chinese Application No. 201310159549.0.

*Primary Examiner* — Lun-Yi Lao
*Assistant Examiner* — Johny Lau
(74) *Attorney, Agent, or Firm* — Sughrue Mion, PLLC

(57) ABSTRACT

A method and apparatus for 2D image and 3D stereoscopic image display are provided. The apparatus includes a display unit to display an image; and a controller to receive a display mode setting signal and to control the display unit according to the received display mode setting signal. The display unit is controlled to display the image in accordance with any one of a 2D display mode, a polarizing glasses 3D display mode, a shutter glasses 3D display mode, and a non-glasses 3D display mode. The method includes receiving a display mode setting signal; reading information stored in a memory, the stored information corresponding to an operation of the switching display panel according to a plurality of display modes, the read information corresponding to the display mode setting signal; and generating a control signal to operate the switching display panel in correspondence to a selected display mode.

18 Claims, 8 Drawing Sheets

(56) References Cited

U.S. PATENT DOCUMENTS

| | | |
|---|---|---|
| 2010/0157425 A1 | 6/2010 | Oh |
| 2010/0238097 A1 | 9/2010 | Baik et al. |
| 2011/0149019 A1 | 6/2011 | Kellerman et al. |
| 2011/0149020 A1 | 6/2011 | Klebanov et al. |
| 2011/0149021 A1 | 6/2011 | Hulyalkar et al. |
| 2011/0149022 A1 | 6/2011 | Klebanov et al. |
| 2011/0149028 A1 | 6/2011 | Klebanov et al. |
| 2011/0149029 A1 | 6/2011 | Kellerman et al. |
| 2011/0149040 A1 | 6/2011 | Klebanov et al. |
| 2011/0150355 A1 | 6/2011 | Kellerman et al. |
| 2012/0120050 A1* | 5/2012 | Hemminki .................... 345/419 |

FOREIGN PATENT DOCUMENTS

| | | |
|---|---|---|
| CN | 102123249 A | 7/2011 |
| CN | 102137265 A | 7/2011 |
| CN | 202150260 U | 2/2012 |
| KR | 10-2000-0075116 A | 12/2000 |

* cited by examiner

METHOD AND APPARATUS FOR STEREOSCOPIC IMAGE DISPLAY

CROSS-REFERENCE TO RELATED APPLICATION

This application claims priority from Korean Patent Application No. 10-2012-0046711, filed on May 3, 2012 in the Korean Intellectual Property Office, the disclosure of which is incorporated herein by reference, in its entirety.

BACKGROUND

1. Field of the Invention

Methods and apparatuses consistent with the exemplary embodiments relate to a method and apparatus for processing and displaying an image signal. More particularly, the exemplary embodiments relate to a method and apparatus for displaying a stereoscopic image. The apparatus is capable of selectively outputting a two-dimensional (2D) or three-dimensional (3D) image, according to a display mode setting signal set by a user.

2. Description of the Related Art

Three-dimensional (3D) images are perceived based on binocular stereopsis. Binocular disparity, i.e., binocular parallax due to the distance between the two eyes which is about 65 mm, is a key factor in providing the perception of stereoscopic depth. When the left and right eyes are presented with different associated images on a two-dimensional (2D) plane, these different images are combined in the brain of the viewer to provide a 3D impression and depth perception.

3D image display technology is generally classified into stereoscopic display, volumetric display, and holographic display. For example, a 3D image display apparatus adopting stereoscopic technology imparts depth information to 2D images, allowing an observer to perceive vividness and reality of three-dimensional images using the depth information.

Systems for 3D viewing can be largely divided into a glasses-type system which requires a pair of eyeglasses, as in FIG. 1A, and a non-glasses-type system which does not require a pair of eyeglasses, as in FIG. 1B. A glasses-type system can provide a visibility range of 120° or more, and the visibility range of a non-glasses-type system is typically 15° or less.

The glasses-type system includes a passive glasses type and an active glasses type. To separately display left-eye and right-eye images, the passive glasses type system may employ eyeglasses having polarizing filters or eyeglasses having blue and red sides for the two eyes respectively. The active glasses type uses liquid crystal shutters for distinguishing between left-eye and right-eye images, wherein viewing via each eye is blocked alternately and chronologically, thereby presenting the left and right eyes with separate images. Thus, in an active glasses-type system, a display apparatus periodically repeats screens that are temporally divided, while a viewer wears a pair of eyeglasses including electronic shutters in synchronization with the period of the display apparatus. The active glass type is also called a time-split type or shuttered glasses type.

As a representative non-glasses-type system, there are a lenticular method and a parallax barrier method. In the lenticular method, a lenticular plate having an array of circular lenses disposed vertically is provided to an image panel. In the parallax barrier method, a barrier layer having regular slits is disposed on an image panel.

Each of the above conventional systems, however, has disadvantages. That is, glasses-type systems require users to wear eyeglasses in order to view stereoscopic images. Non-glasses-type systems, due to their narrow range of visibility, restrict the viewing of stereoscopic images to users situated at a particular position with respect to the display.

SUMMARY

Accordingly, one or more exemplary embodiments provide a method and apparatus for stereoscopic image display, which are capable of adopting both a glasses-type system and a non-glasses-type system.

Further, one or more exemplary embodiments also provide a method and apparatus for stereoscopic image display, which are capable of resolving the limited visibility range of a known non-glasses-type system while minimizing the inconvenience of a known glasses-type system.

A method and apparatus for stereoscopic image display according to exemplary embodiments have the following effects. First, various display modes may be implemented in a single display apparatus, based on a user selection. Second, 2D images and 3D images may be displayed by a single display apparatus adopting a glasses-type system and a non-glasses-type system. Third, the method for stereoscopic image display may be applied to various types of display apparatuses, including those with an LCD, PDP, or OLED type display panel.

Accordingly, aspects of one or more exemplary embodiments may be achieved by providing a stereoscopic image display apparatus that includes a display unit to display an image; and a controller to receive a display mode setting signal and to control the display unit according to the received display mode setting signal, wherein the display unit is controlled to display the image in accordance with any one of a 2D display mode, a polarizing glasses 3D display mode, a shutter glasses 3D display mode, and a non-glasses 3D display mode. The display unit may include a light source; a first polarizing film disposed in front of the light source, to transmit only light of a first polarization; a display panel disposed in front of the first polarizing film; a second polarizing film disposed in front of the display panel, to transmit only light of a second polarization; and a switching display panel disposed in front of the second polarizing film and serving as any of glass, an active retarder, a passive retarder, and a lenticular lens, according to a control signal provided from the controller. The switching display panel may serve as an active retarder for rotating an image from the display panel by 90°, for predetermined lines according to a frame of the image in the polarizing glasses 3D display mode, a passive retarder for converting linearly polarized light into circularly polarized light in the shutter glasses 3D display mode, and a lenticular lens in the non-glasses 3D display mode.

Further aspects of one or more exemplary embodiments may be achieved by providing a display apparatus that includes a light source to emit light; a display panel to output an image, the display panel disposed between first and second polarizing films and arranged to receive light from the light source; and a switching display panel to receive the image from the display panel, the switching display panel configured to serve as a multifunctional device having a function set according to a plurality of display modes of the display apparatus. The switching display panel may serve as glass in a 2D display mode, as an active retarder in a polarizing glasses 3D display mode, as a passive retarder in a shutter glasses 3D display mode, and as a lenticular lens in a non-glasses 3D display mode, wherein the active retarder aligns liquid crystal molecules of the switching display panel, for predetermined lines according to a frame of the image, and the passive retarder converts linearly polarized light into circularly polarized light.

The function of the switching display panel may be set according to a display mode setting signal received by the display apparatus. The first polarizing film may be configured to transmit only light of a first polarization among light from the light source, and the second polarizing film may be configured to transmit only light of a second polarization among light from the display panel.

The display apparatus may further include a third polarizing film, disposed in front of the switching display panel, to change the light output from the switching display panel to linearly polarized light, wherein the switching display panel serves to convert linearly polarized light into circularly polarized light, according to predetermined lines of the image, in a shutter glasses 3D display mode.

Further aspects of one or more exemplary embodiments may be achieved by providing a stereoscopic image display method of a display apparatus comprising a switching display panel configured to serve as a multifunctional device having a function set according to a plurality of display modes of the display apparatus. The method includes receiving a display mode setting signal; reading information from a lookup table stored in a memory, the stored information corresponding to an operation of the switching display panel according to the plurality of display modes, the read information corresponding to the received display mode setting signal; and generating a switching display panel operation control signal to implement the operation of the switching display panel which corresponds to a selected display mode among the plurality of display modes, to control the switching display panel in accordance with any one of the plurality of display modes. The display modes may include a 2D mode, a polarizing glasses 3D mode, a shutter glasses 3D mode, and a non-glasses 3D mode. The switching display panel operation control signal may be generated based on one or both of the read information and the received display mode setting signal.

BRIEF DESCRIPTION OF THE DRAWINGS

The above and/or other aspects of the inventive concept will become apparent and more readily appreciated from the following description of the exemplary embodiments, taken in conjunction with the accompanying drawings, in which.

DETAILED DESCRIPTION OF EXEMPLARY EMBODIMENTS

Figure 1A:
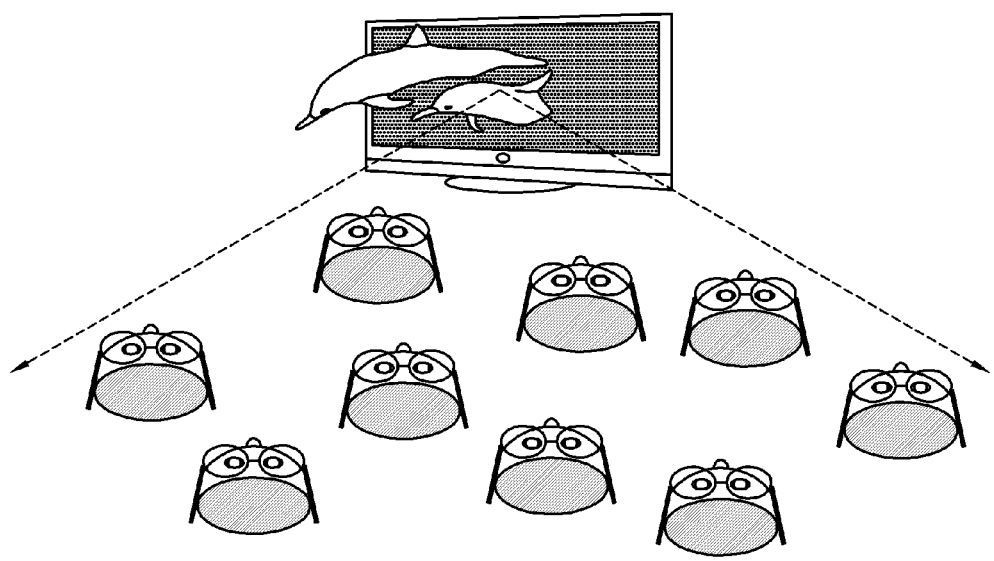
FIGS. 1A and 1B are diagrams depicting stereoscopic image display according to a related art, for explaining 3D viewing by users of a glasses-type system and a non-glasses-type system, respectively.
Figure 1B:
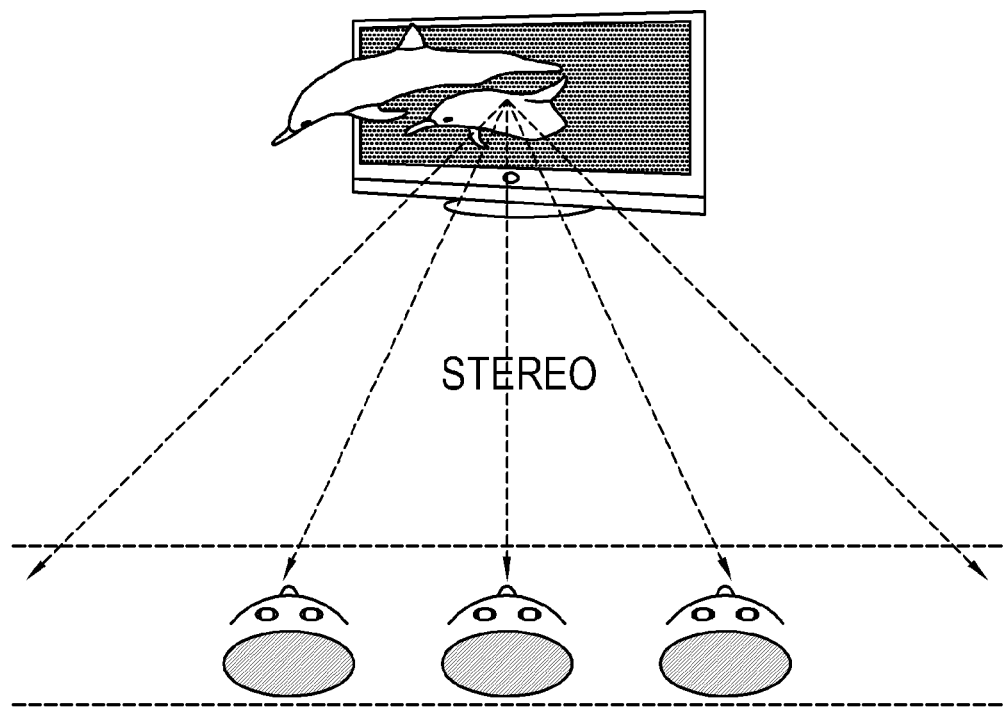

Below, exemplary embodiments will be described in detail with reference to accompanying drawings so as to be easily implemented by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 2:
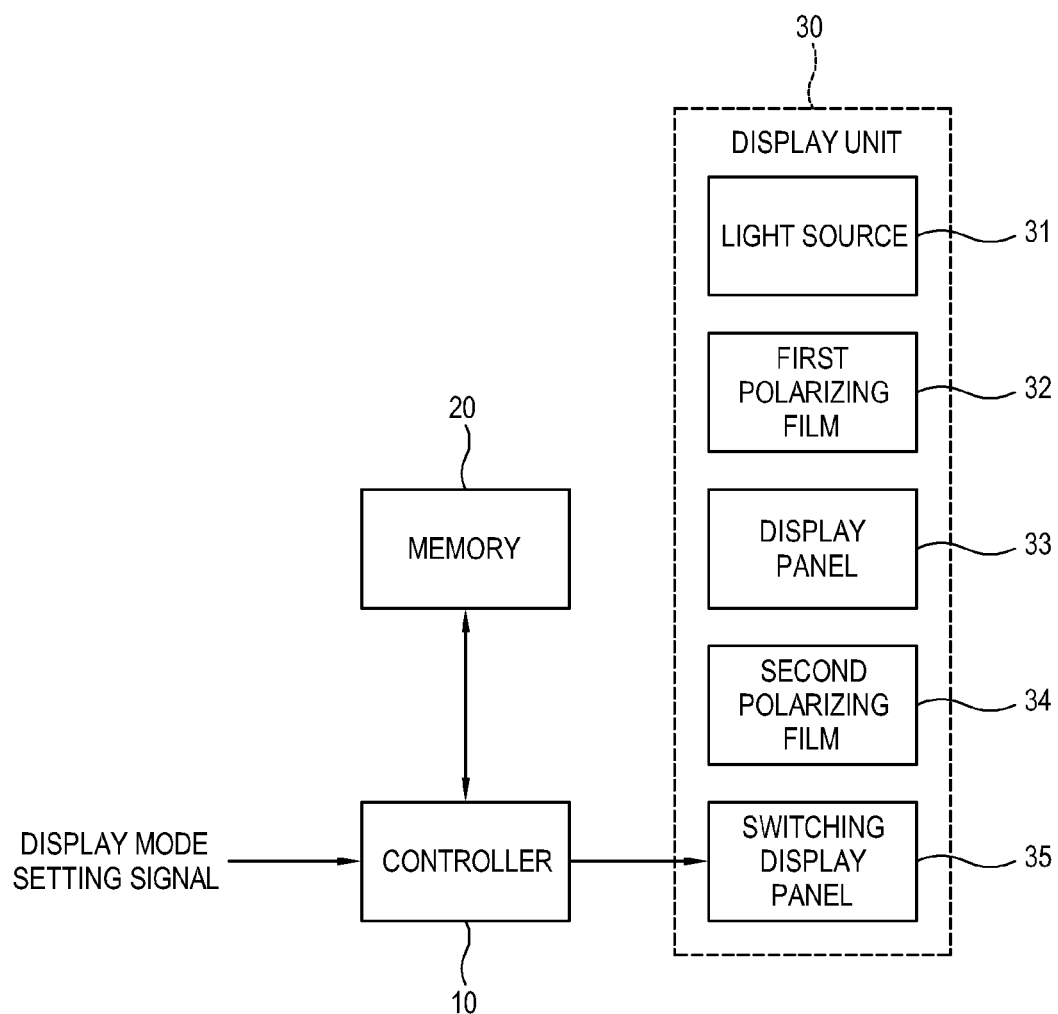
FIG. 2 is a schematic block diagram of a stereoscopic image display apparatus according to an exemplary embodiment.
Figure 5:
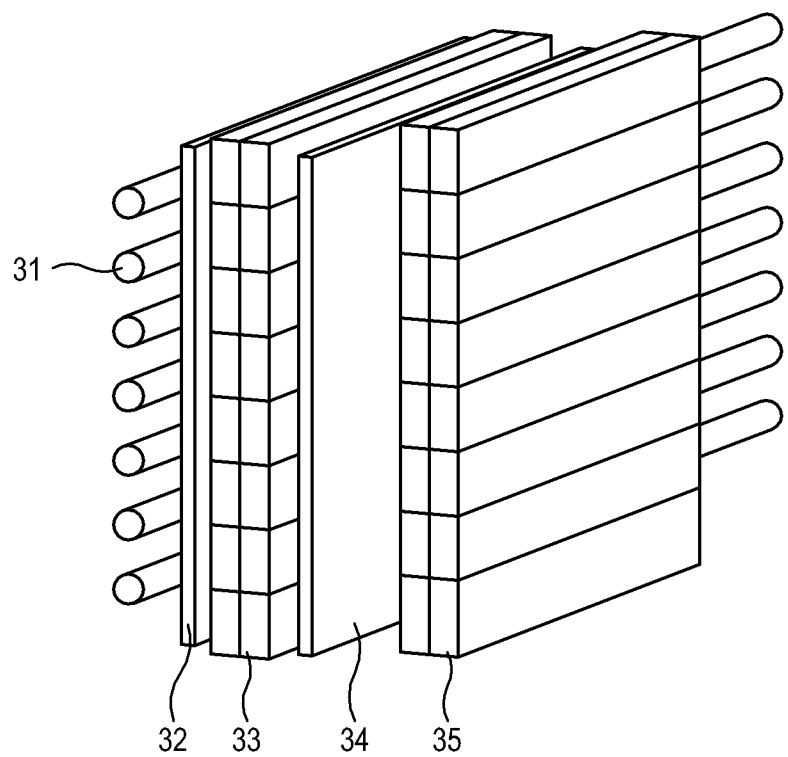
FIG. 5 is a diagram illustrating the structural configuration of a display unit of the stereoscopic image display apparatus according to the embodiment of FIG. 2 or 3.

FIG. 2 illustrates a configuration of a stereoscopic image display apparatus according to an exemplary embodiment. As shown in FIG. 2, the stereoscopic image display apparatus (hereinafter, display apparatus) includes a controller 10, a memory 20 or lookup table in which information relating to an operation of a switching display panel 35 according to a display mode is stored, and a display unit 30 to perform a display operation according to a control signal provided from the controller 10 and output to the switching display panel 35 of the display unit 30. The display unit 30 includes a light source 31, a first polarizing film 32 installed in front of the light source 31, a display panel 33 installed in front of the first polarizing film 32, a second polarizing film 34 installed in front of the display panel 33, and the switching display panel 35 installed in front of the second polarizing film 34. In other words, the display panel 33, which outputs an image using the light from the light source 31, is disposed between the first and second polarizing films 32 and 34 and is arranged to receive light from the light source 31. The basic structure of the display unit 30 is shown in FIG. 5.

The controller 10 receives a display mode setting signal and reads, from the lookup table of the memory 20, information necessary to control an operation of the display unit 30 according to the received display mode setting signal. The controller 10 analyzes the read information and, based on the result of the analysis, outputs the control signal to the switching display panel 35 of the display unit 30. According to the control signal provided from the controller 10, the display unit 30 outputs an image in accordance with any one of a 2D mode, a polarizing glasses 3D mode, a shutter glasses 3D mode, and a non-glasses 3D mode.

The light source 31 generates and emits light. The first polarizing film 32 and the second polarizing film 34 have characteristics of transmitting only light of a predetermined polarization, that is, to pass specifically polarized light while blocking other light. The first and second polarizing films 32 and 34 may have different polarizing characteristics, that is, to transmit light of a first polarization and a second polarization.

The switching display panel 35 serves as any of glass, an active retarder, a passive retarder, and a lenticular lens, depending upon the control signal provided from the controller 10. The switching display panel 35 may be variously formed, including, for example, as glass filled liquid crystal or as a liquid lens. The switching display panel 35 may be configured to function as ordinary transparent (general) glass when power is not supplied and to covert to a lens form when power is supplied. That is, the switching display panel 35, which receives the image from the display panel 33 through the second polarizing film 34, is configured to serve as a multifunctional device having a function set according to any one of the plurality of display modes of the display apparatus, wherein the display mode is selected by the user.

The display mode setting signal may be provided to the controller 10 through various methods. First, a display mode may be set using a button or set of buttons for setting a display mode, which may be provided at a predetermined position of a body of the display apparatus, e.g., at a front lower part or a lateral side of a television receiver. Here, a plurality of buttons may include those for setting the respective modes and be differently labeled as, for example, "2D," "polarizing glasses," "shutter glasses," and "no glasses." Alternatively, a display mode can be set by displaying a screen enabling manipulation of a general screen adjustment button, e.g., a virtual key. Instead of using the body of the display apparatus, the display mode setting signal may be received through an external device, e.g., a remote controller, provided with the above plurality of buttons or with a button menu to set the display mode according to a guide, i.e., a menu screen, displayed by the display apparatus.

In setting a display mode through the menu screen, the controller 10 may first display a setup screen in order to determine whether to effect a 2D or 3D display. When a 3D display is selected, the controller 10 displays a screen for selecting a glasses mode or a non-glasses mode and receives a selection signal input by a user. When the glasses mode is selected, the controller 10 displays a screen for selecting a polarizing mode or a shutter mode and similarly receives a selection signal with respect to these two modes. In this way, a display mode setting signal may be generated through multiple user selections and provided to the controller 10, which then analyzes the received display mode setting signal.

Figure 3:
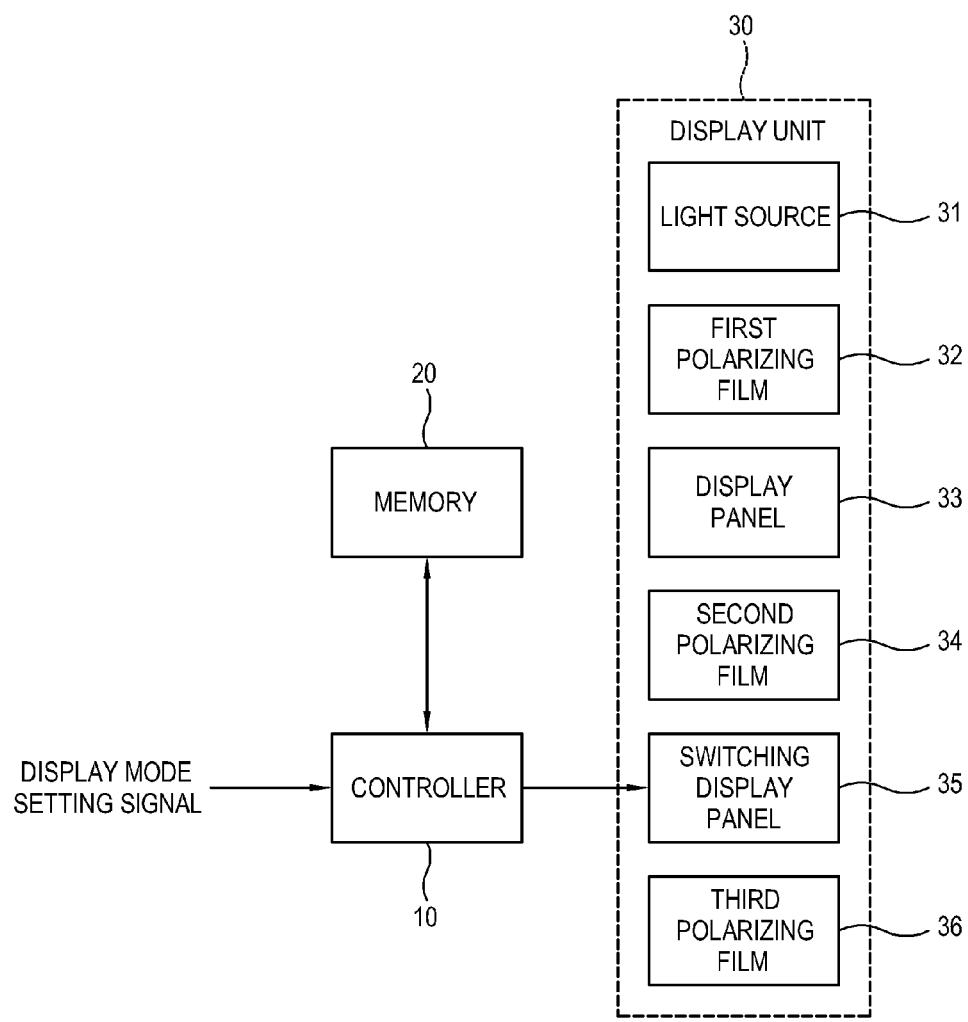
FIG. 3 is a schematic block diagram of a stereoscopic image display apparatus according to another exemplary embodiment.

FIG. 3 illustrates a configuration of a stereoscopic image display apparatus according to another exemplary embodiment. As shown in FIG. 3, a display unit 30' of the display apparatus further includes a third polarizing film 36 placed in front of the switching display panel 35. Otherwise, the configuration of FIG. 3 is essentially the same as that of FIG. 2. Such a configuration pertains to viewing a 3D image using shutter glasses. In a shutter glasses display mode of the stereoscopic image display apparatus, the shutter glasses function to switch between left-eye and right-eye images. As the outermost polarizing film, the third polarizing film 36 serves to change the light output from the switching display panel 35 to linearly polarized light and to enable viewing of full-resolution 3D images using shutter glasses.

Figure 4:
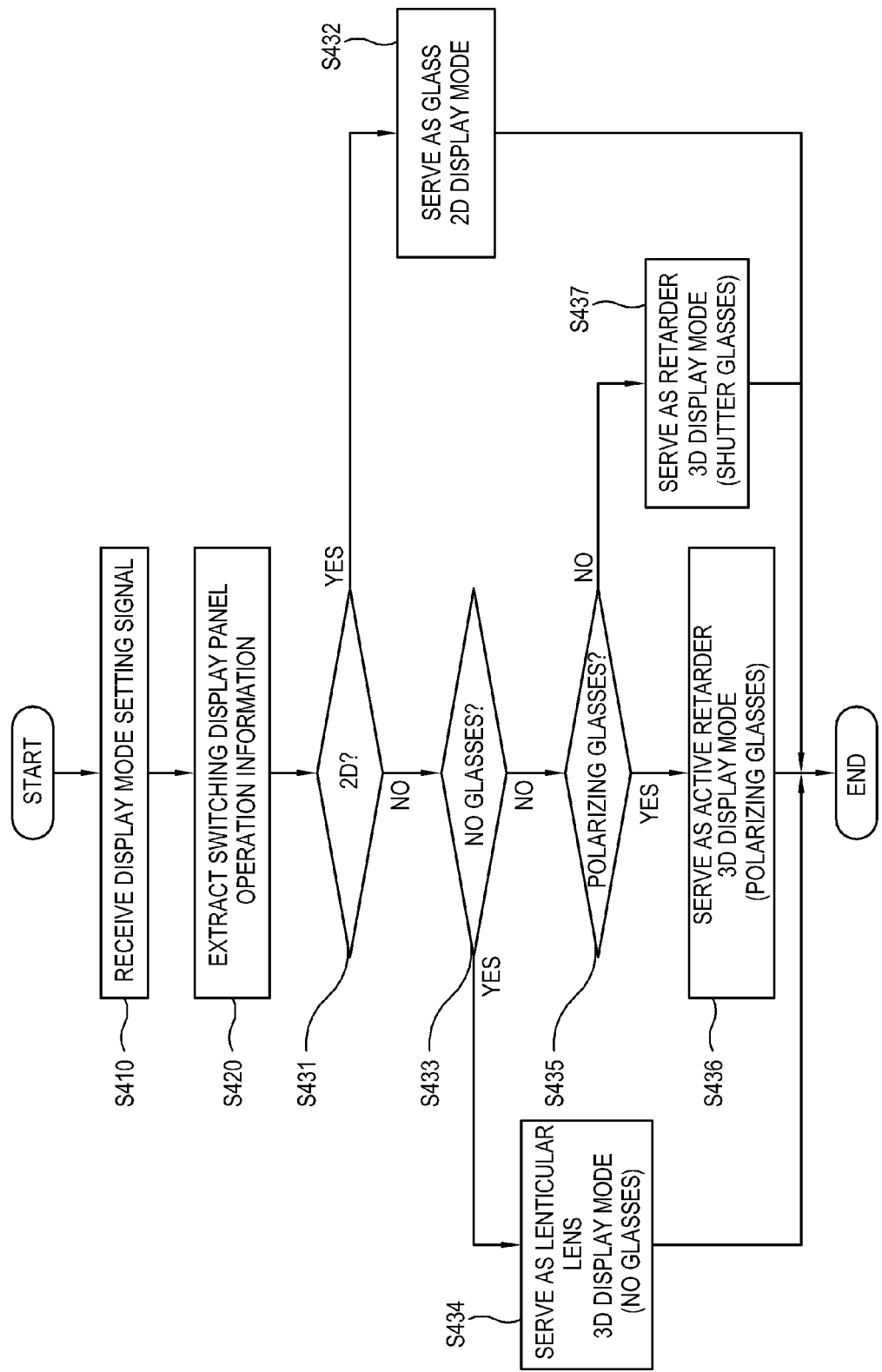
FIG. 4 is a flowchart illustrating a stereoscopic image display method according to an exemplary embodiment.

FIG. 4 illustrates a stereoscopic image display method according to an exemplary embodiment. As shown in FIG. 4, the controller 10 receives a display mode setting signal, which may be transmitted to the controller 10 by various means as described above (S410). Then, based on the received display mode setting signal, the controller 10 extracts (reads) information previously stored in the lookup table of the memory 20 and, based on the read information, generates a switching display panel operation control signal (i.e., the control signal) to implement a switching display panel operation which corresponds to a current display mode (S420). The information stored in the lookup table is information for controlling an operation of the switching display panel 35 according to the display mode.

Using a selection button provided on an external device or a predetermined part of the display apparatus, a user makes a selection as to whether to view a 2D image (S431). When the user selects 2D viewing, the controller 10 provides a corresponding control signal to the switching display panel 35, or simply provides no control signal (or no power) to the switching display panel 35, whereby the switching display panel 35 functions as general glass to enable 2D image viewing (S432). When a user selects 3D viewing at the step S431, i.e., the "NO" branch, the controller 10 determines whether the display mode setting signal is configured for viewing 3D images in a glasses mode or for viewing 3D images in a non-glasses mode (S433).

In the non-glasses mode for viewing 3D images, i.e., the "YES" branch of the step S433, the controller 10 applies power to the switching display panel 35, and the switching display panel 35 serves as a lenticular lens (S434). In doing so, the switching display panel 35 functions to separate visual fields of left-eye and right-eye images provided through the display panel 33.

In the glasses mode for viewing 3D images, i.e., the "NO" branch of the step S433, the controller 10 determines whether the display mode setting signal is configured for viewing 3D images using polarizing glasses (S435). For users possessing a pair of polarizing glasses for viewing 3D images, the display apparatus may operate such that a user wearing the polarizing glasses can view a 3D image on the display apparatus. That is, when polarizing glasses are employed in a polarizing glasses display mode, the controller 10 controls the switching display panel 35 to serve as an active retarder, whereby the switching display panel 35 functions to specifically align the molecules of liquid crystal for alternate, or predetermined, lines according to a frame of the image (S436). On the other hand, for users possessing a pair of shutter glasses for viewing 3D images, the display apparatus may operate such that a user wearing the shutter glasses can view a 3D image on the display apparatus. That is, when shutter glasses are employed in a shutter glasses display mode, the controller 10 controls the switching display panel 35 to serve as a passive retarder, whereby the switching display panel 35 does not serve to separate left-eye and right-eye images (S437). Instead, during the step S437, the shutter glasses function to switch left-eye and right-eye images.

Figure 6:
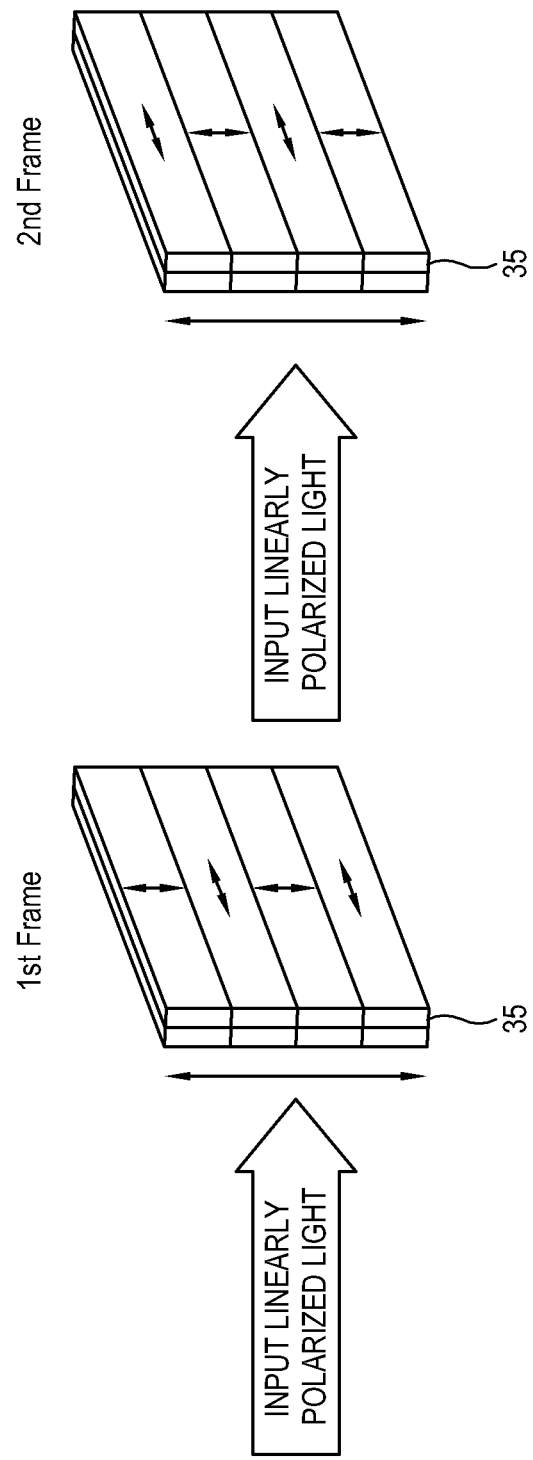
FIG. 6 is a diagram illustrating an operation of the switching display panel in a stereoscopic image display apparatus according to an exemplary embodiment.

As shown in FIG. 6, illustrating an operation of the switching display panel 35 in a stereoscopic image display apparatus according to an exemplary embodiment, the switching display panel 35 aligns the liquid crystal molecules corresponding to even-numbered lines to block light (image transmission) in a first frame and aligns the liquid crystal molecules corresponding to odd-numbered lines to block light (image transmission) in a second frame. In FIG. 6, a 90° rotation of light polarization is represented by a horizontal line with arrows, while the vertical lines with arrows represent a polarization enabling image transmission. Such polarization effectively rotates the image from the display panel 33, by 90°, for predetermined lines according to a frame of the image. In this way, the switching display panel 35 serves as an active retarder, as in the step S436, thereby displaying a full-resolution 3D image in a polarizing glasses mode. For example, left-eye images may be displayed by the odd-numbered lines in the first frame, and right-eye images may be displayed by the even-numbered lines in the second frame, thereby enabling a display of images without deterioration in resolution.

Figure 7:
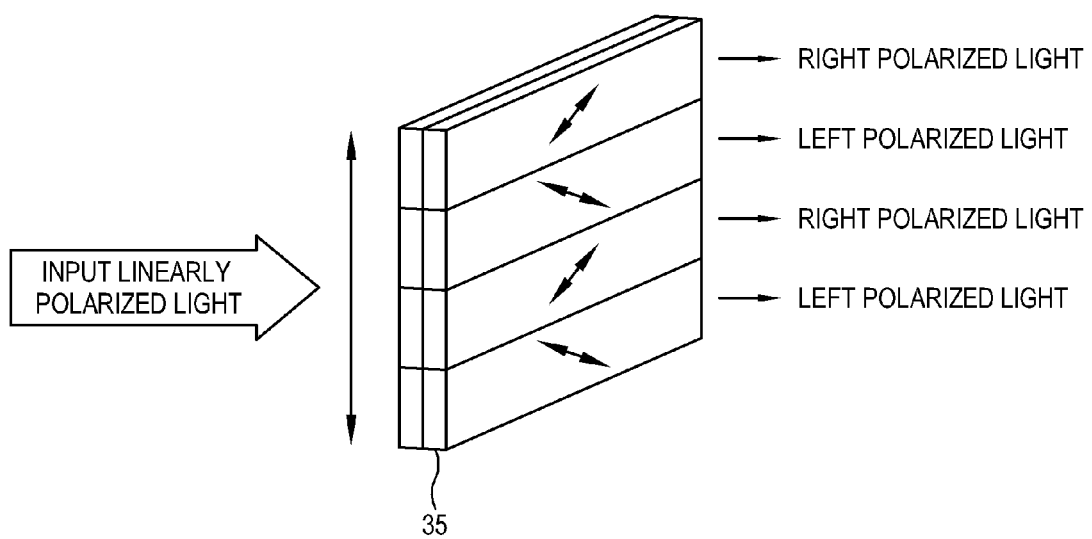
FIG. 7 is a diagram illustrating an operation of the switching display panel in a stereoscopic image display apparatus according to another exemplary embodiment.

FIG. 7 illustrates an operation of the switching display panel 35 in a stereoscopic image display apparatus according to another exemplary embodiment. In the shutter glasses display mode of the step S437, the shutter glasses function to switch left-eye and right-eye images. While use of linearly polarizing shutter glasses decreases brightness, use of circularly polarizing shutter glasses adversely affects 3D resolution. Specifically, the use of circularly polarizing shutter glasses decreases 3D resolution by one half. To solve this problem, the third polarizing film 36 may be provided to the switching display panel 35, as shown in FIG. 3. In this case, the switching display panel 35 serves to convert linearly polarized light into circularly polarized light, as shown in FIG. 7, wherein the output light becomes circularly polarized according to line, as either left handed or right handed circularly polarized light for alternate, or predetermined, lines. The thus-polarized light is then changed to linearly polarized light by the third polarizing film 36, and in doing so, viewing of full-resolution 3D images using shutter glasses is enabled.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A stereoscopic image display apparatus, comprising:
   a display unit to display an image; and
   a controller to receive a display mode setting signal and to control the display unit according to the received display mode setting signal,
   wherein the display unit is controlled to display the image in accordance with any one of a two-dimensional (2D) display mode, a polarizing glasses three-dimensional (3D) display mode, a shutter glasses 3D display mode, and a non-glasses 3D display mode,
   wherein the display unit comprises a switching display panel serving as one of a glass, an active retarder, a passive retarder, and a lenticular lens according to the display mode setting signal, and
   wherein the switching display panel serves as the glass when the controller determines that the display mode setting signal indicates the 2D display mode, the switching display panel serves as the active retarder when the controller determines that the display mode setting signal indicates the polarizing glasses 3D display mode, the switching display panel serves as the passive retarder when the controller determines that the display mode setting signal indicates the shutter glasses 3D display mode, and the switching display panel serves as the lenticular lens when the controller determines that the display mode setting signal indicates the non-glasses 3D display mode.

2. The stereoscopic image display apparatus of claim 1, wherein the display unit comprises:
   a light source;
   a first polarizing film disposed in front of the light source, to transmit only light of a first polarization;
   a display panel disposed in front of the first polarizing film; and
   a second polarizing film disposed in front of the display panel, to transmit only light of a second polarization,
   wherein the switching display panel is disposed in front of the second polarizing film.

3. The stereoscopic image display apparatus of claim 2, wherein
   the active retarder rotates an image from the display panel by 90°, for predetermined lines according to a frame of the image in the polarizing glasses 3D display mode, and
   the passive retarder converts linearly polarized light into circularly polarized light in the shutter glasses 3D display mode.

4. The stereoscopic image display apparatus of claim 2, wherein the display unit further comprises a third polarizing film disposed in front of the switching display panel.

5. The stereoscopic image display apparatus of claim 1, wherein the controller is configured to receive the display mode setting signal from an external device.

6. The stereoscopic image display apparatus of claim 5, wherein the external device comprises a button for setting a display mode.

7. The stereoscopic image display apparatus of claim 1, further comprising a button for setting a display mode.

8. The stereoscopic image display apparatus of claim 1, wherein the display unit displays a menu screen for setting a display mode.

9. The stereoscopic image display apparatus of claim 1, wherein the display panel comprises any of an LCD, a PDP, and an OLED.

10. A display apparatus comprising:
    a light source to emit light;
    a display panel to output an image, the display panel disposed between first and second polarizing films and arranged to receive light from the light source; and
    a switching display panel to receive the image from the display panel, the switching display panel configured to serve as a multifunctional device having a function set according to a plurality of display modes of the display apparatus,
    wherein the switching display panel serves as a glass when a selected one of the plurality of modes is a 2D display mode, the switching display panel serves as an active retarder when the selected one of the plurality of modes is a polarizing glasses 3D display mode, the switching display panel serves as a passive retarder when the selected one of the plurality of modes is a shutter glasses 3D display mode, and the switching display panel serves as a lenticular lens when the selected one of the plurality of modes is a non-glasses 3D display mode.

11. The display apparatus of claim 10, wherein the active retarder aligns liquid crystal molecules of the switching display panel, for predetermined lines according to a frame of the image, and the passive retarder converts linearly polarized light into circularly polarized light.

12. The display apparatus of claim 10, wherein the function is set according to a display mode setting signal received by the display apparatus.

13. The display apparatus of claim 10, wherein the first polarizing film is configured to transmit only light of a first polarization among light from the light source, and the second polarizing film is configured to transmit only light of a second polarization among light from the display panel.

14. The display apparatus of claim 10, further comprising a third polarizing film, disposed in front of the switching display panel, to change the light output from the switching display panel to linearly polarized light.

15. The display apparatus of claim 14, wherein the switching display panel serves to convert linearly polarized light into circularly polarized light, according to predetermined lines of the image, in the shutter glasses 3D display mode.

16. A stereoscopic image display method of a display apparatus comprising a switching display panel configured to serve as a multifunctional device having a function set according to a plurality of display modes of the display apparatus, the stereoscopic image display method comprising:
    receiving a display mode setting signal;
    reading information from a lookup table stored in a memory, the information corresponding to an operation of the switching display panel according to the plurality of display modes, the read information corresponding to the received display mode setting signal; and
    generating a switching display panel operation control signal to implement the operation of the switching display panel which corresponds to a selected display mode among the plurality of display modes, to control the switching display panel in accordance with any one of the plurality of display modes, wherein the plurality of display modes includes a two-dimensional (2D) mode, a polarizing glasses three-dimensional (3D) mode, a shutter glasses 3D mode, and a non-glasses 3D mode, where the switching display panel serves as a glass when the selected display mode is the 2D display mode, the switching display panel serves as an active retarder when the selected display mode is the polarizing glasses 3D display mode, the switching display panel serves as a passive retarder when the selected display mode is a shutter glasses 3D display mode, and the switching display panel serves as a lenticular lens when the selected display mode is the non-glasses 3D display mode.

17. The stereoscopic image display method of claim 16, wherein the active retarder rotates an image from the display panel by 90°, for predetermined lines according to a frame of the image in the polarizing glasses 3D display mode, and the passive retarder converts linearly polarized light into circularly polarized light in the shutter glasses 3D display mode.

18. The stereoscopic image display method of claim 16, wherein the switching display panel operation control signal is generated based on at least one of the read information and the received display mode setting signal.

* * * * *